United States Patent [19]

Moores, Jr.

[11] 4,402,241

[45] Sep. 6, 1983

[54] SPINDLE LOCKING MEANS FOR POWER OPERATED TOOL

[75] Inventor: Robert G. Moores, Jr., Reisterstown, Md.

[73] Assignee: Black & Decker Inc., Newark, Del.

[21] Appl. No.: 291,398

[22] Filed: Aug. 10, 1981

[51] Int. Cl.³ .............................................. B27B 5/38
[52] U.S. Cl. ......................................... 83/478; 83/49; 279/1 K; 30/391
[58] Field of Search .................. 83/490, 478, 701; 30/370, 390, 391; 279/1 K

[56] References Cited

U.S. PATENT DOCUMENTS

| 2,872,197 | 2/1959 | Happe | 279/1 K X |
| 3,232,159 | 2/1966 | Stanley | 83/490 X |
| 3,454,055 | 7/1969 | Schnettler | 83/490 X |
| 4,358,230 | 11/1982 | Rohlin | 279/1 K X |

*Primary Examiner*—Donald R. Schran
*Attorney, Agent, or Firm*—R. B. Sherer; Harold Weinstein; Charles E. Yocum

[57] ABSTRACT

An electric saw or other power-operated tool carries a spring-loaded pin for selectively locking the output spindle against rotation and facilitating removal of the blade. The locking pin comprises a bent wire-formed element pivotably retained in the housing. One end of the pin is slidably received within a flanged bearing opening in the stationary guard. When the pin is pivoted by the operator, the end of the pin is received within an aperture in the inner flange washer, the latter forming part of the clamping mechanism for fixedly securing the blade on the spindle.

10 Claims, 4 Drawing Figures

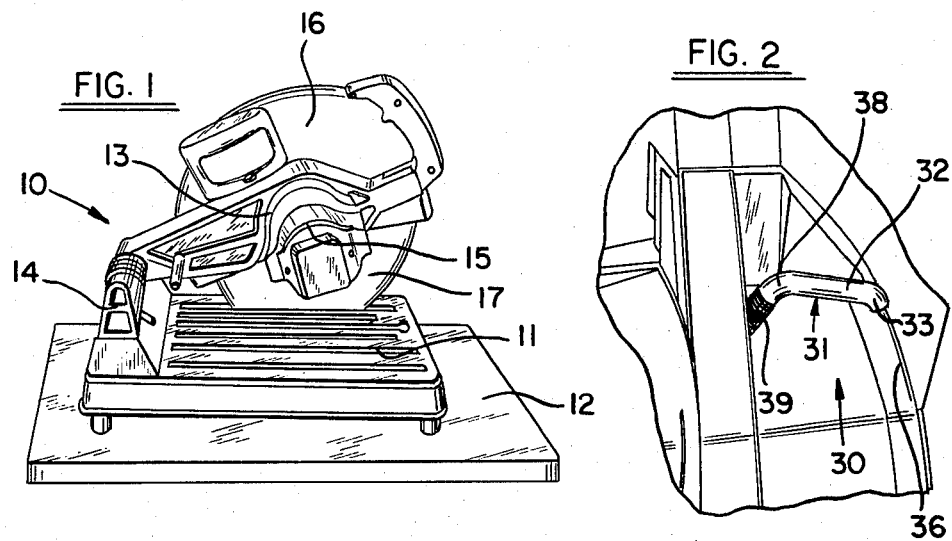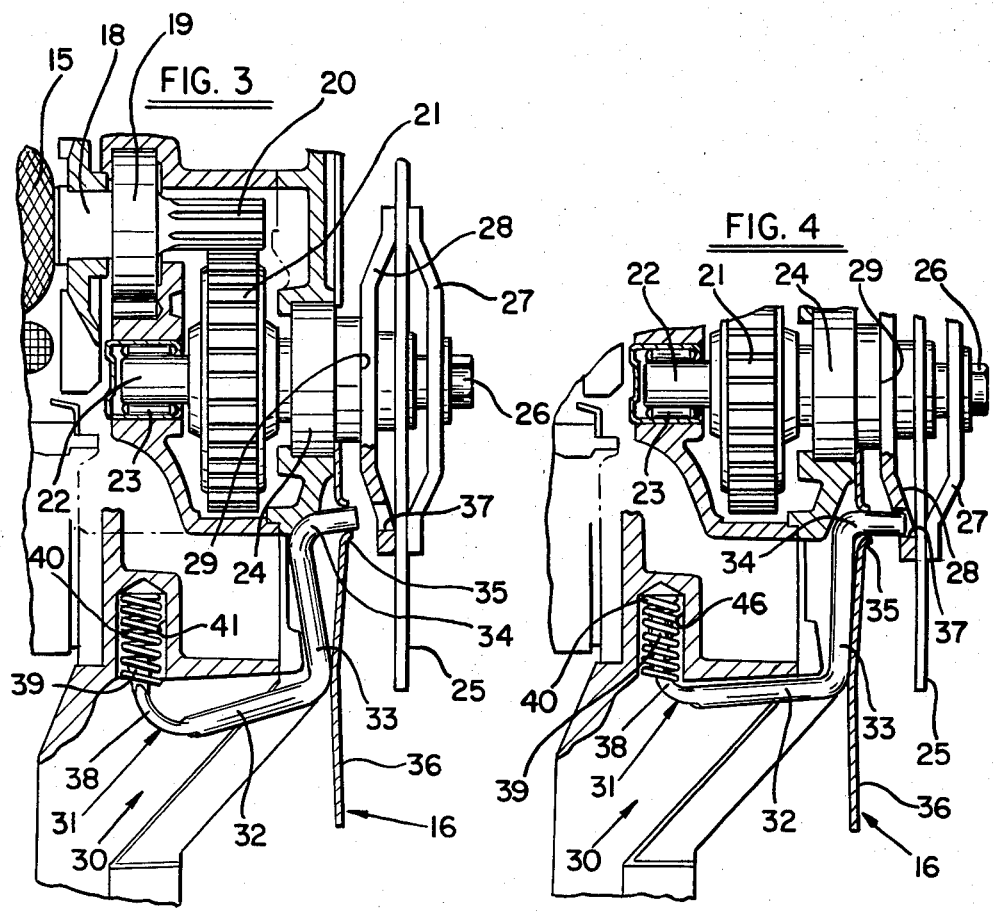

SPINDLE LOCKING MEANS FOR POWER OPERATED TOOL

BACKGROUND OF THE INVENTION

Spindle locking mechanisms for electric saws or other power-operated tools are old in the art. For example, the mechanisms of the prior art may comprise a spring-loaded axially-movable pin that is selectively pushed by the operator to engage an apertured plate carried in the drive train for the blade or other tool element, thereby locking the spindle and facilitating removal of the blade. The art has also taught the use of a pivoted latching lever with serrations on its outer surface to accommodate a manual manipulation; the latching lever engages an apertured plate mounted on the spindle. These prior art teachings, while generally satisfactory, are unduly complicated and hence somewhat expensive.

SUMMARY OF THE INVENTION

It is an object of the present invention to provide a simple, reliable low-cost spindle locking mechanism for an electric saw or other tool.

It is another object of the present invention to provide a spring-loaded bent wire-formed locking member, pivotably retained in the housing, and selectively actuated by the operator to lock the output spindle against rotation.

It is yet another object of the present invention to provide a high-strength low-cost locking member, pivotably retained in the housing, and having a relatively large radius of engagement with respect to the axis of the output spindle, thereby providing a definite mechanical advantage.

In accordance with the teachings of the present invention, the spindle locking means comprise a manually-manipulatable pivotable locking pin retained between the housing and the guard for the saw blade. One end of the pin is slidably received within a bearing means in the guard, and extends beyond the guard towards an inner flange washer, the latter forming part of the clamping mechanism for fixedly securing the saw blade to the spindle. A resilient means biases the pin in a direction away from the flange washer. When the pin is pivoted against the biasing force of the resilient means, the end of the pin is received within an aperture formed in the flange washer, thereby locking the spindle against rotation and facilitating removal of the blade.

These and other objects of the present invention will become apparent from a reading of the following specification, taken in conjunction with the enclosed drawings.

DETAILED DESCRIPTION

FIG. 1 is a side elevation of an electric saw for cutting off or "chopping off" work articles, in which the present invention may find particular utility;

FIG. 2 is a partial bottom plan view of the saw of FIG. 1;

FIG. 3 is an enlarged sectional view, taken along the lines 3—3 of FIG. 1, showing the normal unlocking position of the bent wire-formed pivotable locking pin of the present invention; and FIG. 4 corresponds to a portion of FIG. 3; but shows the pin in its locking position.

With reference to FIG. 1, there is illustrated an electric saw 10 having a base 11 adapted to be supported upon and secured to a workbench 12 or other table support. The saw comprises a housing 13 pivotably mounted to the base as at 14, and being constantly urged by aa spring (not shown) to a normal position above the base. A motor 15 in the housing drives a saw blade (not shown in FIG. 1). The blade is enclosed by a stationary upper guard 16 and a "drop down" lower guard 17. A control handle 18 allows the operator to move the saw towards the base and against the spring-loaded pivoted mounting 14 in the process of "chopping off" the work or otherwise making a suitable cut.

It will be understood by those skilled in the art that the particular saw 10 is only illustrative of one application of the present invention, and that the teachings of the invention are equally applicable to other power-operated tools, such as a cut-off machine having an abrasive wheel, as well as various portable tool and devices.

With this in mind, and with reference to the remaining drawings, particularly FIGS. 3 and 4, the motor 15 has an armature shaft 18 journaled in a bearing 19 in the housing. The end of the armature shaft is formed with a pinion 20 engaging a gear 21 mounted on an output spindle 22 journaled in bearings 23 and 24 mounted in the housing. The spindle carries a saw blade 25 fixedly secured to the spindle by means of a clamping nut 26, an outer flange washer 27 and an inner flange washer 28, the latter bearing against a shoulder 29 formed on the spindle.

In order to facilitate removal of the clamping nut for access to or replacement of the blade, a spindle locking means 30 is provided. The locking means of the present invention comprises a locking pin 31 carried by the housing. Preferably, the locking pin is a wire-formed piece comprising a main body portion 32, an integral intermediate portion 33 bent substantially at right angles to the main body portion, and an end portion 34 laterally offset with respect to the main body portion. The end portion 34 is slidably journaled within a flanged bearing opening 35 in a portion 36 of the stationary upper guard which is disposed between the housing and the inner flange washer 28. At least one aperture 37 is formed in the inner flange washer for selectively receiving the end of the pin.

The opposite end 38 of the locking pin is flattened as at 39 and carries a coiled spring 40 seated within a blind recess 41 formed in a lower portion of the housing. The end 38 of the pin is bent with respect to its main body portion 32 in a direction substantially similar to the intermediate portion 33. The intermediate portion 33 is lodged between the housing and the guard portion 36 to retain the locking pin within the housing. The main body portion of the locking pin is accessible to the operator beneath the housing and forwardly of the motor. When the main body portion of the locking pin is pushed by the operator, the locking pin pivots through a slight angle with respect to the housing (as shown in FIG. 4) and the end 34 of the pin 31 is received in the aperture 37 of the inner flange washer 28, thereby locking the washer and hence the spindle against rotation and facilitating removal of the clamping nut and saw blade.

It will be understood by those skilled in the art that more than one aperture 37 may be formed in the inner flange washer 28, and the clamping nut and hence the spindle and inner flange washer may be rotated slightly to aline the aperature 37 with respect to the end of the pin.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. In combination with a power-operated tool having a housing, an output spindle journaled in the housing, a tool element driven by the spindle, means including an inner flange washer for fixedly securing the tool element on the spindle, a stationary guard for the tool element, the guard having a portion disposed between the housing and the inner flange washer, and a locking means for the spindle to facilitate removal of the tool element from the spindle, said locking means comprising a manually-manipulutable pivotable locking pin retained between the housing and the guard, the guard having bearing means therein for slidably receiving one end of the pin, resilient means biasing the pin in a direction away from the flange washer, and the flange washer having at least one aperture formed therein for selectively receiving the end of the pin, whereby whenever the pin is pivoted against the biasing force of the resilient means, the end of the pin extends beyond the bearing means in the guard and is received within the aperture in the flange washer, thereby locking the spindle against rotation.

2. The combination of claim 1, wherein the locking pin comprises a main body portion selectively pivotable through a slight angle with respect to the housing, the end of the pin being laterally offset with respect to the main body portion, and an integral intermediate portion between the main body portion and the end of the pin, the intermediate portion being bent approximately at right angles to the main body portion and to the end of the pin, respectively, and being lodged between the housing and the guard to retain the locking pin in its normal unlocking position.

3. The combination of claim 2, wherein the housing has a lower portion provided with a blind recess, wherein the opposite end of the pin is bent with respect to its main body portion and is received within at least a portion of the recess, and wherein the resilient means comprises a coil spring carried by the opposite end of the pin and seated within the recess in the housing.

4. The combination of claim 3, wherein the opposite end of the pin is bent approximately in the direction of the intermediate portion of the pin, and wherein the opposite end of the pin is flattened to engage one end of the coil spring.

5. The combination of claim 1, wherein the pin comprises a formed wire.

6. The combination of claim 1, wherein the bearing means on the guard comprises a flanged opening.

7. The combination of claim 1, wherein the tool comprises a saw, and wherein the tool element comprises a circular saw blade.

8. In a power-operated saw, the combination of a housing, an output spindle journaled in the housing and having a circular saw blade mounted thereon, a pair of flange washers, one on each side of the blade and comprising an inner flange washer and an outer flange washer, a clamping nut bearing against the outer flange washer for rigidly securing the blade against an annular shoulder on the spindle, a pivotable locking pin retained in the housing, resilient means constantly urging the pin in a direction away from the flange washers, and one of the flange washers having at least one aperture therein for selectively receiving the end of the pin when the pin is pivoted with respect to the housing, thereby locking the spindle against rotation and facilitating removal of the clamping nut to replace the blade.

9. In a power-operated saw, the combination of a housing, an output spindle journaled in the housing and having a circular saw blade mounted thereon, clamping means fixedly securing the saw blade on the spindle, a wire-formed locking pin retained in the housing and comprising a main body portion, an end portion laterally offset with respect to the main body portion, and an integral intermediate portion between the end portion and the main body portion, resilient means constantly urging the locking pin in a direction away from the clamping means, and the clamping means having at least one aperture formed therein for selectively receiving the end of the pin, thereby locking the spindle against rotation and facilitating removal of the blade.

10. A power-operated saw having a housing, a motor in the housing, an output spindle journaled in the housing and driven by the motor, a circular saw blade carried by the spindle, means including an inner flange washer for clamping the blade to the spindle, a stationary guard mounted on the housing for enclosing a portion of the blade, the guard having a portion disposed between the housing and the inner flange washer, the guard portion having a flanged bearing opening formed therein, a wire-formed pivotable locking pin having a main body portion adapted to be manipulated by the operator, an end portion laterally offset with respect to the main body portion and slidably received within the flanged bearing opening formed in the guard, and an integral intermediate portion between the main body portion and the end of the pin, the intermediate portion being bent substantially at right angles to the main body portion and the end of the pin, respectively, and being lodged between the housing and the guard, thereby retaining the pin in the housing, the opposite end of the pin being bent with respect to the main body portion in substantially the same direction as the intermediate portion, the housing having a lower portion with a blind recess formed therein for receiving the opposite end of the pin, a spring seated within the recess and carried by the opposite end of the pin, thereby urging the pin away from the recess in the housing, and thereby urging the end of the pin in a direction away from the inner flange washer, and the inner flange washer having at least one aperture formed therein, whereby the main body portion of the pin may be pushed by the operator against the force of the spring, thereby pivoting the pin through a slight angle, and whereby the end of the pin is received in the aperture in the inner flange washer, thereby locking the spindle against rotation and facilitating removal of the blade.

* * * * *